United States Patent

Hanaoka

[11] Patent Number: 4,655,466
[45] Date of Patent: Apr. 7, 1987

[54] CART

[75] Inventor: Hiroshi Hanaoka, Tokyo, Japan

[73] Assignee: Hanaoka Sharyo Co., Ltd., Tokyo, Japan

[21] Appl. No.: 817,774

[22] Filed: Jan. 9, 1986

Related U.S. Application Data

[63] Continuation of Ser. No. 507,714, Jun. 23, 1983, abandoned.

[30] Foreign Application Priority Data

Mar. 31, 1983 [JP] Japan .............................. 58-47468[U]

[51] Int. Cl.$^4$ .............................................. B62B 3/02
[52] U.S. Cl. .............................. 280/47.37 R; 108/145; 187/18; 254/9 C; 280/35
[58] Field of Search ................. 280/47.37 R, 35, 651, 280/47.34, 79.1 A, 43.12; 108/145; 254/2 C, 9 C, 8 C, 122, 124; 187/8.71, 18, 8.72

[56] References Cited

U.S. PATENT DOCUMENTS

| | | | |
|---|---|---|---|
| 2,897,910 | 8/1959 | Steely | 280/79.1 R |
| 3,112,676 | 12/1963 | Boulsover | 254/122 |
| 3,350,065 | 10/1967 | Mankey | 254/122 |
| 4,194,723 | 3/1980 | Grove | 254/122 |
| 4,274,644 | 6/1981 | Taylor | 280/39 |
| 4,405,116 | 9/1983 | Eisenberg | 187/18 |
| 4,447,041 | 5/1984 | Fujita | 254/122 |
| 4,457,403 | 7/1984 | Ream | 254/122 |

FOREIGN PATENT DOCUMENTS

2461629 3/1981 France .................... 280/35

*Primary Examiner*—David M. Mitchell
*Attorney, Agent, or Firm*—Martin A. Farber

[57] ABSTRACT

A cart having a frame, front and rear wheels, and a handle. A pair of elevating link mechanisms are mounted on the frame, each comprising a pair of arms pivotally connected to each other at intermediate positions thereof, rollers are provided on both ends of each of the arms, lower rollers are mounted on rails provided on the frame. A carrier is engaged with upper rollers of the link mechanisms by guide rails. A hydraulic jack is vertically provided on the frame, a ram of the jack engages with a ram receiver supported on two corresponding arms at lower portions thereof and rotatable about lateral axis. A pump is provided for supplying liquid to said hydraulic jack. The elevating link mechanisms are extended by projecting the ram of the jack for elevating the carrier.

1 Claim, 7 Drawing Figures

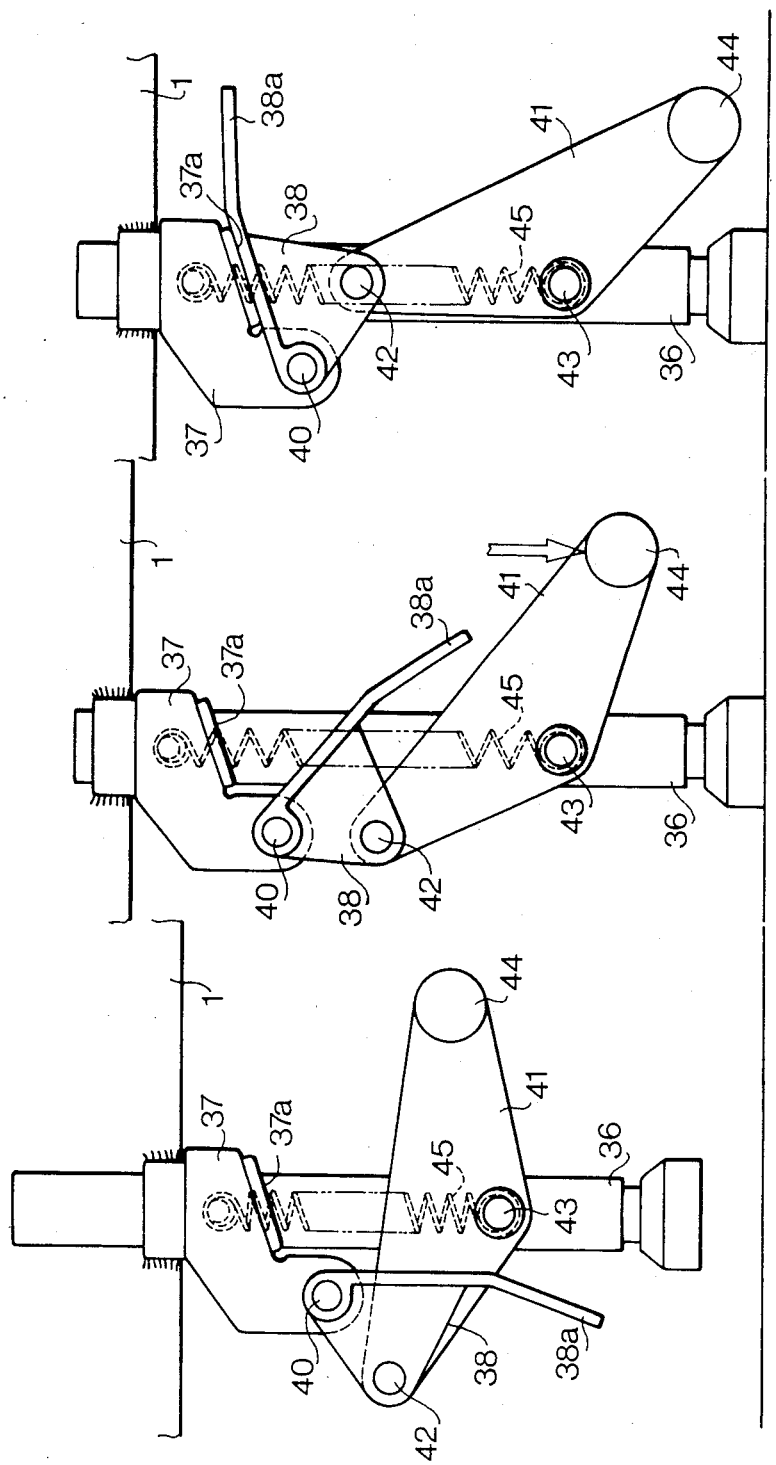

4,655,466

CART

RELATED APPLICATION

This application is a continuation of my previously co-pending patent application Ser. No. 507,714 filed June 23, 1983 (now abandoned).

BACKGROUND OF THE INVENTION

The present invention relates to a cart, such as a handcart or an electric cart, with a carrier which can be elevated, in general. More particularly, the invention relates to a cart with a high-power hydraulic jack which can be easily mounted on the cart.

A conventional handcart of the above-mentioned type is provided with a frame having front and rear wheels, a pair of elevating link mechanisms each comprising a pair of arms pivotally connected to each other at intermediate points thereof, a carrier mounted on the top of the pair of elevating link mechanisms, and a hydraulic jack for expanding the link mechanisms to raise the carrier, whereby the loading operation can be easily done.

However, the handcarts of this type are complicated in operation of lifting the carrier, and need a special design for mounting the jack because the inclination of the jack changes as the link mechanisms lift the carrier. Further, in order to make it easier to mount the jack, means for transmitting the power of the jack to the link mechanisms must be additionally provided, which results in high cost and complicated construction.

SUMMARY OF THE INVENTION

Therefore, it is an object of the present invention to remove such drawbacks by providing a cart which is stable in operation of the carrier and is simple in construction.

According to the present invention, there is provided a cart having a frame, front and rear wheels, and a handle, comprising: a pair of elevating link mechanisms mounted on the frame, each comprising a pair of arms pivotally connected to each other at intermediate position thereof; rollers provided on both ends of each of the arms; a carrier mounted on the link mechanisms; guide rails provided on the frame and on the underside of the carrier for guiding the rollers in the fore-and-aft direction; a hydraulic jack vertically disposed and secured to said frame at a rear portion thereof, said hydraulic jack having a ram; a ram receiver having a flat horizontal plate abutting a top of said ram of said hydraulic jack, said ram receiver having a leg at each end thereof, and a lower end portion of each said leg being pivotally connected to a corresponding of said arms in each of the link mechanisms at a lower portion thereof rotatable about a lateral axis; a pump for supplying liquid to the hydraulic jack; first means for operating the pump; second means for connecting upper portions of corresponding two arms with the carrier.

Other objects and features of the present invention will be more apparent from the following description with reference to the accompanying drawings.

BRIEF DESCRIPTION OF THE DRAWINGS

FIGS. 5 to 7 show a support leg device and operation thereof.

DETAILED DESCRIPTION OF THE PREFERRED EMBODIMENT

Figure 1:
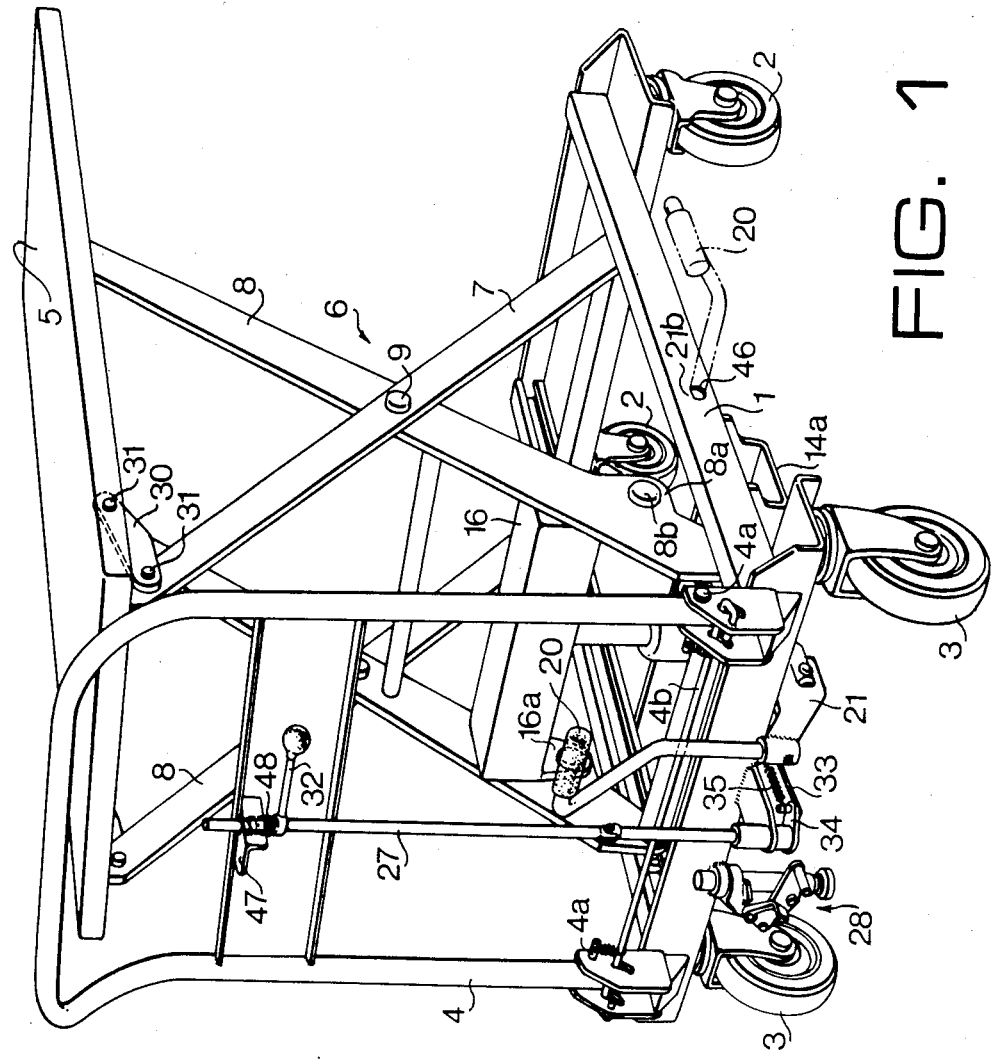
FIG. 1 is a perspective view showing an embodiment of the present invention.

In the drawings, pairs of front and rear wheels 2 and 3 are attached to a frame 1 adjacent four corners thereof. An inverted U-shaped handle 4 is pivotally mounted on shafts 4a at their lower ends to a rear side of the frame 1, and is locked by a lock bar 4b in the illustrated upright position. The lock bar 4b is lowered by depressing an operator's foot, so that the handle 4 is released and folded onto the frame, as shown by an arrow in FIG. 2. A carrier plate 5 supported by a pair of elevating link mechanisms 6 is mounted on the frame 1. Each elevating link mechanism 6 comprises a pair of arms 7 and 8 which are linked by a pivot pin 9 at their intermediate points and are arranged to be rotatable in relation to each other about the pivot pin 9. A roller 10 is provided on each top end of the arms 7 and 8 so as to roll on one of a pair of rails 13 which are formed on the underside of the carrier 5 along the opposite lateral sides of the carrier. A roller 11 is provided on each lower end of the arms 7 and 8 and adapted to roll on one of a pair of rails 12 which are formed on opposite lateral sides of the frame 1. A link plate 30 is pivotally connected between the carrier 5 and the arm 7 by a pair of pivot pins 31, so as to restrict the fore-and-aft movement of the carrier 5 with respect to the elevating link mechanisms 6. A channel iron 14a is secured to the frame 1 at a portion adjacent to the rear wheels 3 and is extended transversely across the width of the frame 1. A hydraulic jack 14 is securely mounted on the center of the channel iron 14a and a top of a vertically extensible ram 15 is engaged with a central portion of a ram receiver 16 pivotally mounted at opposite ends thereof to the arms 8. The ram receiver 16 has an inverted U-shaped cross section and has a pair of legs 16a which are pivotally connected to flanges 8a formed on the arms 8 by pivot pins 8b respectively. The pivot pins 8b are disposed lower than the top end of the ram 15. At the rear side of the frame 1, a jack pedal 20 for operating the jack 14 is connected to an arm 21.

Figure 3:
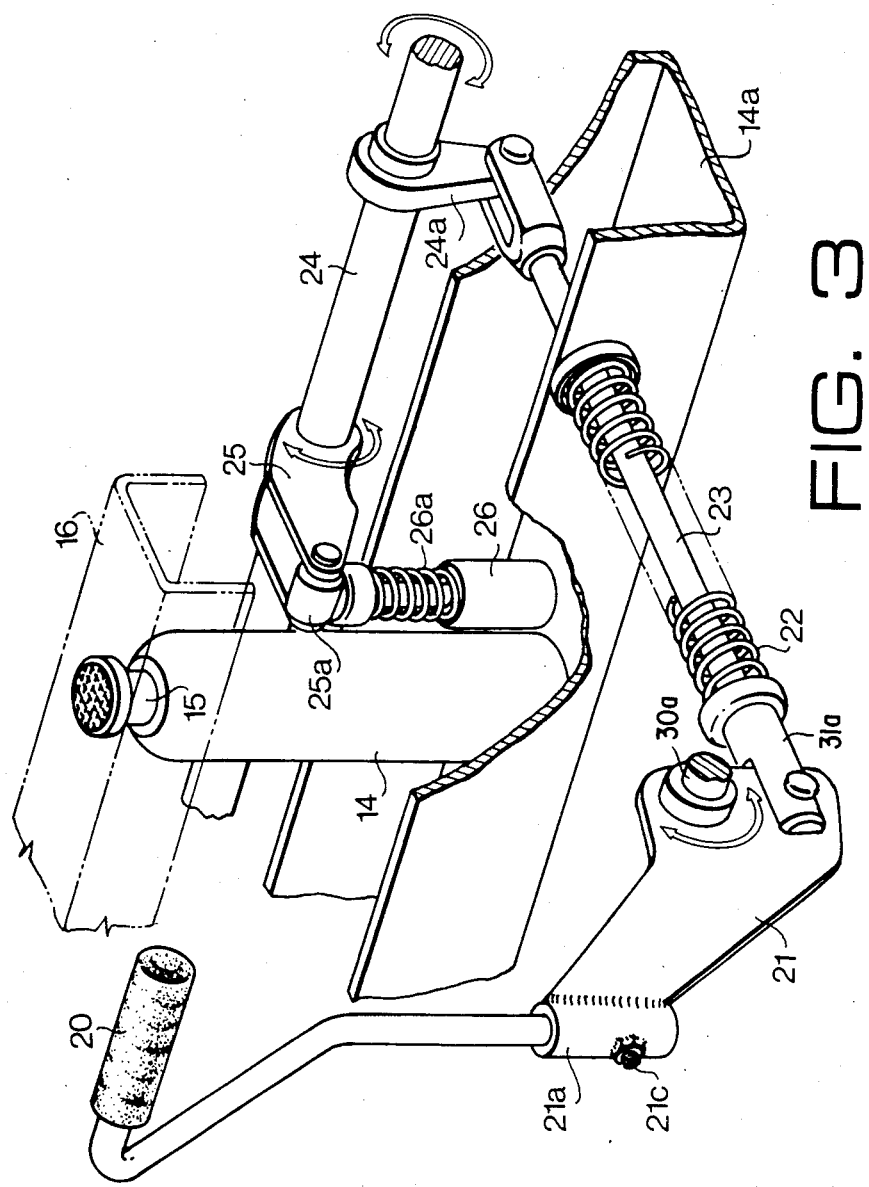
FIG. 3 is an explanatory perspective view showing the actuation of hydraulic jack.
Figure 4:
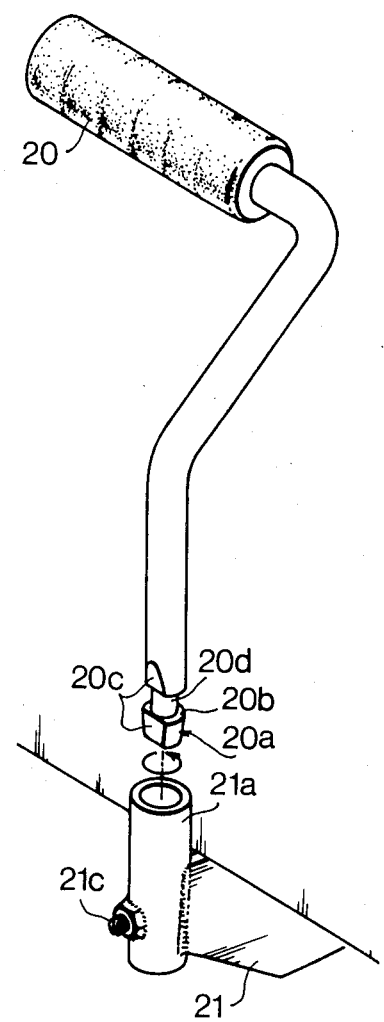
FIG. 4 is an exploded perspective view showing a pedal mechanism for operating a pump.

As shown in FIG. 4, the pedal 20 has an engaging block 20a having a half-moon cross section by a bevelled portion 20c. The engaging block 20a is slidably engaged with a bore in a cylindrical portion 21a of the arm 21. The block 20a has bevelled portion 20c and an annular groove 20d except the bevelled portion. A lock pin 21c is secured to the cylindrical portion 21a, so that an inner end thereof projects into the bore in the cylindrical portion. Thus, the pedal 20 is fixed to the arm 21 by rotating the pedal 180 degrees about the axis thereof after the block is engaged with the bore, resulting in engaging of the lock pin 21c with the groove 20d. As shown in FIG. 3, the arm 21 is rotatably mounted on a shaft 30a and a lower portion of the arm is engaged with a fork member 31a secured to an end of a push rod 23. Shaft 30a is suitably held in fixed relation to iron 14a so as to enable rotable action of arm 21 about shaft 30a. A compressed return spring 22 is wound around the push rod 23 so that the rod 23 can be self-returned. The other end of the push rod 23 is connected to an arm 24a secured to a bar 24 which is rotatably supported in the frame 1. Secured to the bar 24 is a pump-drive lever 25, the other end of which is provided with a roller 25a which is attached to a top of a rod 26a of a pump 26. The rod 26a of the pump 26 is reciprocated by reciprocating rotation of the bar 24 to supply pressure oil to the jack 14.

Referring to FIG. 1, a vertical release bar 27 is rotatably supported at the rear side of the handle 4 and adapted to be rotated by operating a lever 32. The lower end of the release bar 27 is connected to a reciprocating bar 33 through a lever 34, thereby to longitudinally move the bar 33. The other end of the bar 33 is operatively connected to a release valve (not shown) of the jack 14. Between the lever 32 and the bracket 47, and between the lever 34 and the frame 1, return springs 48 and 35 are provided, respectively.

Figure 2:
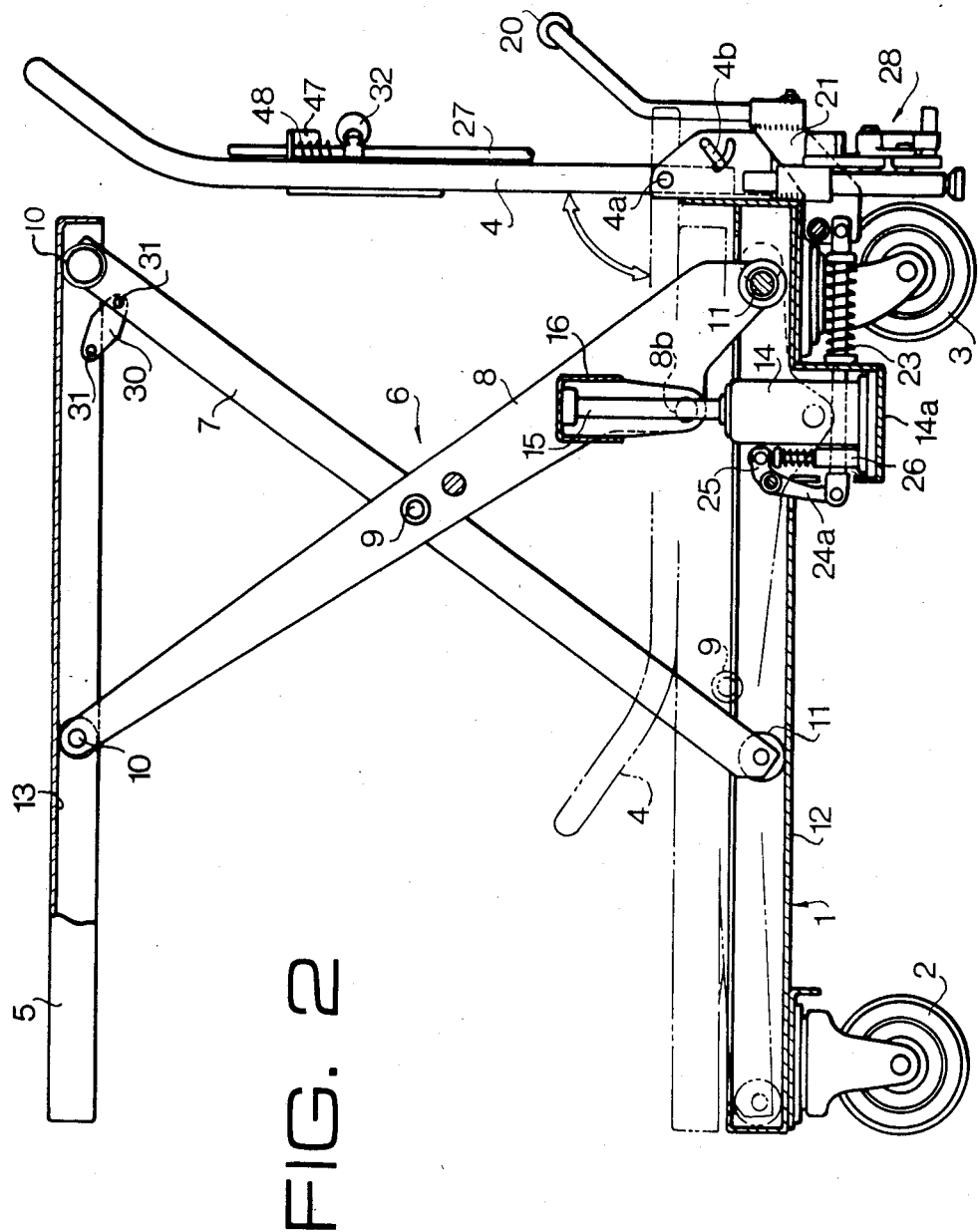
FIG. 2 is a side view thereof with a part cut away.

While the carrier 5 is in the lowest position, the whole length of the ram 15 is retracted into the jack 14, and the pair of elevating link mechanisms 6 are folded almost flat on the frame 1 so that the carrier 5 contacts with the upper face of the frame 1 as shown by broken link of FIG. 2.

The operation of the present invention will be explained hereinafter. When the jack pedal 20 is repeatedly depressed to operate the pump 26, pressure oil is supplied to the jack 14 to extend the ram 15 vertically. Thus, the link mechanisms 6 are extended gradually by the ram receiver 16. As the link mechanisms 6 extends, the carrier 5 is horizontally lifted up to the top end position which is indicated by the solid line of FIG. 2. Thus, the carrier 5 can be raised to a desired height for loading and unloading.

While the carrier 5 is being lifted, the ram 15 of the jack vertically extends maintaining abutment with the receiver 16. In order to permit such a vertical movement of the ram 16, rollers 10 and 11 roll along the rails 12 and 13 thereby to shift the position of links 6.

When the release lever 32 is operated to rotate the release bar 27, the release valve is opened as long as the lever 32 is operated.

As the oil pressure exerted on the ram 15 of the jack 14 is released, the links 6 are gradually folded by the weight of the load on the carrier 5, lowering the ram receiver 16 and the ram 15. When the lever 32 is returned by the springs 48 and 35, the release valve is closed to stop the lowering of the ram 15. Thus, the carrier 5 descends to its lower position by operating the lever 32.

Further, numeral 28 in FIG. 1 indicates a support leg device which is grounded during loading operation and is lifted away from the ground during transporting operation.

Referring to FIGS. 5 to 7, the supporting leg device 28 comprises a leg 36 slidably engaged in a sleeve 37 secured to the frame 1, a release lever 38 pivotally connected to the frame 1 by a pin 40, an actuating lever 41 connected to an end of the release lever 38 by a pin 42 at one end thereof and to the leg 36 by a pin 43 at an intermediate portion thereof, a pedal 44 secured to the lever 41 at the other end, and spring 45 provided between the leg 36 and the frame 1.

FIG. 5 shows a leg up state, where the actuating lever 41 is in a horizontal position by the spring 45. When the pedal 44 is depressed, the actuating lever 41 is rotated about the pin 43 with lowering the leg 36 and rotating the release lever 36 about the pin 40 in the counterclockwise direction. When the pin 42 passes a neutral line connecting the pins 40 and 43, an end portion 38a of the release lever 38 is abutted on a lower end portion 37a of the sleeve 37 (FIG. 7).

When operator's foot is removed from the pedal 44, the weight of the cart is received by the engagement between the release lever 38 and the lower end portion 37a. When the end portion 38a is forcibly depressed by operator's foot, the release lever 38 is rotated in the clockwise direction about the pin 40. When the pin 42 passes the neutral line, the leg 36 is raised by the spring 45.

In an electric cart (not shown) driven by a DC motor operated by a battery mounted thereon, the pump 26 can be operated by the motor. In such an embodiment, clutches are provided in power transmission systems for driving the cart and the pump, and the clutches are selectively engaged by operating a switch. The electric cart can also be provided with an AC motor supplied with current through cables for operating the pump.

The pedal 20 can be removed from the arm 21 by rotating 180 degrees. The block 20a of the removed pedal 20 can be engaged with a hole 46 (FIG. 1) formed in the side of the frame 1, having a half-moon shaped opening which corresponds to the half-moon cross section of the block 20a. When the pedal 20 is engaged with the hole 46 and rotated 180 degrees, the rounded portion 20b of the block engages with the underside of a closure portion 21b. Accordingly, the pedal is fixed to the hole as shown by dotted line in FIG. 1. Thus, the cart can be lifted by operator's hand with gripping the pedal and carried.

From the above description, it will be understood that by the cart of the present invention, the hydraulic jack is vertically fixedly secured on the frame in which the ram is extensible only in the vertical direction to raise the ram receiver, and the rollers on the ends of the arms of the link mechanisms allow the horizontal movement of the elevating link mechanisms along the frame and the carrier with small friction. Further, as the horizontal movements of rear-upper ends of the link arms are limited, the power of the jack is used for lifting the carrier without wasting its power. Thus, the lifting capacity, the strength and stability of the carrier are greatly improved. Further, the construction itself is made simple.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A cart having a frame, front and rear wheels, and a handle, comprising:
    a pair of elevating link mechanisms mounted on said frame, each comprising a pair of arms pivotally connected to each other at intermediate position thereof;
    rollers provided on both ends of each of said arms;
    a carrier mounted on said link mechanisms;
    guide rails provided on said frame and on the underside of said carrier for guiding said rollers in the fore-and-aft direction;
    a hydraulic jack vertically provided on said frame;
    a ram receiver engaging with a ram of said hydraulic jack, said ram receiver being supported on two corresponding arms at lower portions thereof and rotatable about a lateral axis;

a pump for supplying liquid to said hydraulic jack;

first means for operating said pump;

second means for connecting upper portions of corresponding two arms with said carrier;

said first means comprises a pedal and a link mechanism, which is operated by operator's foot;

wherein said pedal is removable from said link mechanisn and is adapted to be attached to said frame for transporting the cart.

* * * * *